UNITED STATES PATENT OFFICE.

WILLIAM CHITTENDEN TAYLOR AND HENRY PHELPS GAGE, OF CORNING, NEW YORK, ASSIGNORS TO CORNING GLASS WORKS, OF CORNING, NEW YORK, A CORPORATION OF NEW YORK.

GLASS.

1,411,133. Specification of Letters Patent. Patented Mar. 28, 1922.

No Drawing. Application filed December 20, 1920. Serial No. 432,075.

*To all whom it may concern:*

Be it known that we, WILLIAM CHITTENDEN TAYLOR and HENRY PHELPS GAGE, citizens of the United States of America, and residents of Corning, New York, have invented certain new and useful Improvements in Glass, of which the following is a specification.

In another application filed December 13, 1920 by William C. Taylor, one of the present inventors, is described a means of intensifying the color effect of manganese dioxide by the use of a small quantity of chromium sesquioxide.

The present application has for its object to utilize this discovery in producing a glass which is absolutely opaque to visible light in plates 6 mm in thickness while having considerable infra-red transmission. The following is given as an example of a batch formula for glass made in accordance with this invention and having the desired properties:—

| | |
|---|---|
| $SiO_2$ (silica) | 46% |
| $PbO$ (litharge) | 33% |
| $K_2O$ (potash) | 14% |
| $MnO_2$ (manganese dioxide) | 6% |
| $K_2Cr_2O_7$ (potassium dichromate) | 1% |

This glass without the chromate is appreciably transparent, not only to the blue but also to visible red light. This glass containing the chromate only, will absorb the blue light ordinarily transmitted by a dense manganese glass, such as the glass containing 6% manganese. The effect of combining the chromate in the same batch with the manganese is to so intensify the absorption of the manganese that visible red light is no longer transmitted. To obtain without the chromates the same red absorption, the manganese dioxide content would have to be increased to about 20%. It is believed that the coloring effect produced is due to the chromium sesquioxide ($Cr_2O_3$) resulting from the decomposition of the dichromate in the furnace so that neglecting the melting losses, the chromium sesquioxide content of such a glass is about one-half of 1%.

It is obvious that the proportions of various ingredients may be modified so long as the manganese dioxide content does not fall below the point where proper colorization is obtained and the potassium dichromate content does not fall below the point at which the blue ordinarily transmitted by a dense manganese glass will be completely absorbed by the chromium.

What is claimed is:

1. A glass opaque to the visible light in plates 6 mm in thickness, and containing manganese dioxide and chromium sesquioxide.

2. A glass opaque to the visible light in plates 6 mm in thickness, and containing manganese dioxide and sesquioxide of chromium, the percentage of the former being at least twice as great as the percentage of the latter.

3. A glass opaque to the visible light in plates 6 mm in thickness, and containing about 6% manganese dioxide and one half of 1% chromium sesquioxide.

4. A glass opaque to the visible light in plates 6 mm in thickness, and containing manganese dioxide and chromium sesquioxide, the manganese oxide content being less than 20%.

In testimony whereof we have hereunto signed our names at Corning, New York, this sixteenth day of December, 1920.

WILLIAM CHITTENDEN TAYLOR.
HENRY PHELPS GAGE.